United States Patent
Dar et al.

(10) Patent No.: US 8,443,379 B2
(45) Date of Patent: May 14, 2013

(54) PEEK AND LOCK USING QUEUE PARTITIONING

(75) Inventors: Affan Arshad Dar, Woodinville, WA (US); Sanjib Saha, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 12/141,081

(22) Filed: Jun. 18, 2008

(65) Prior Publication Data

US 2009/0320044 A1 Dec. 24, 2009

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................................... 719/314

(58) Field of Classification Search .................... 719/314
See application file for complete search history.

(56) References Cited

U.S. PATENT DOCUMENTS

| | | | |
|---|---|---|---|
| 5,887,168 A * | 3/1999 | Bahls et al. ................... | 719/314 |
| 5,960,178 A * | 9/1999 | Cochinwala et al. ......... | 709/232 |
| 6,044,418 A | 3/2000 | Muller | |
| 6,055,560 A * | 4/2000 | Mills et al. .................... | 709/200 |
| 6,058,389 A | 5/2000 | Chandra et al. | |
| 6,141,346 A | 10/2000 | Caldara et al. | |
| 6,226,641 B1 * | 5/2001 | Hickson et al. ....................... | 1/1 |
| 6,263,364 B1 | 7/2001 | Najork et al. | |
| 6,771,653 B1 | 8/2004 | Le Pennec et al. | |
| 6,954,933 B2 | 10/2005 | Stall | |
| 7,464,138 B2 * | 12/2008 | Le et al. ......................... | 709/206 |
| 2003/0110232 A1 | 6/2003 | Chen et al. | |
| 2005/0267941 A1 | 12/2005 | Addante et al. | |
| 2006/0155894 A1 * | 7/2006 | Pennington ...................... | 710/52 |
| 2006/0218560 A1 * | 9/2006 | Dadiomov et al. ........... | 719/314 |
| 2008/0033920 A1 | 2/2008 | Colclasure et al. | |
| 2008/0040396 A1 | 2/2008 | Wallis et al. | |
| 2008/0115128 A1 * | 5/2008 | Achanta et al. ............... | 718/100 |

OTHER PUBLICATIONS

"Multi-programming Environment", Hewlett-Packard Development Company, L.P., pp. 2, Feb. 2008.
Narlikar, et al., "Pthreads for Dynamic and Irregular Parallelism", in Proceedings of "Supercomputing 98: High Performance Networking and Computing", Nov. 1998, pp. 21.
"Unified Queuing System and BPS", Scientific Computing Division FY1998 Annual Scientific Report, pp. 4.

* cited by examiner

Primary Examiner — Emerson Puente
Assistant Examiner — Kimbleann Verdi
(74) Attorney, Agent, or Firm — Michael B Dodd; Dodd Law Group

(57) ABSTRACT

A queue management system may store a queue of messages in a main queue. When a message is processed by an application, the message may be moved to a subqueue. In the subqueue, the message may be locked from other applications. After processing the message, the application may delete the message from the subqueue and complete the action required. If the application fails to respond in a timely manner, the message may be moved from the subqueue to the main queue and released for another application to service the message. If the application responds after the time out period, a fault may occur when the application attempts to delete the message from the subqueue. Such an arrangement allows a "peek and lock" functionality to be implemented using a subqueue.

16 Claims, 2 Drawing Sheets

PEEK AND LOCK USING QUEUE PARTITIONING

BACKGROUND

Queues are software and hardware constructs that may be used to regulate the operation of a vast array of applications. Many applications operate on a message basis and may store items in a queue for processing. Such applications may be extensible by having multiple processors that may process individual messages. In order to increase capacity, additional processors may be used to process more messages in parallel.

SUMMARY

A queue management system may store a queue of messages in a main queue. When a message is processed by an application, the message may be moved to a subqueue. In the subqueue, the message may be locked from other applications. After processing the message, the application may delete the message from the subqueue and complete the action required. If the application fails to respond in a timely manner, the message may be moved from the subqueue to the main queue and released for another application to service the message. If the application responds after the time out period, a fault may occur when the application attempts to delete the message from the subqueue. Such an arrangement allows a "peek and lock" functionality to be implemented using a subqueue.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
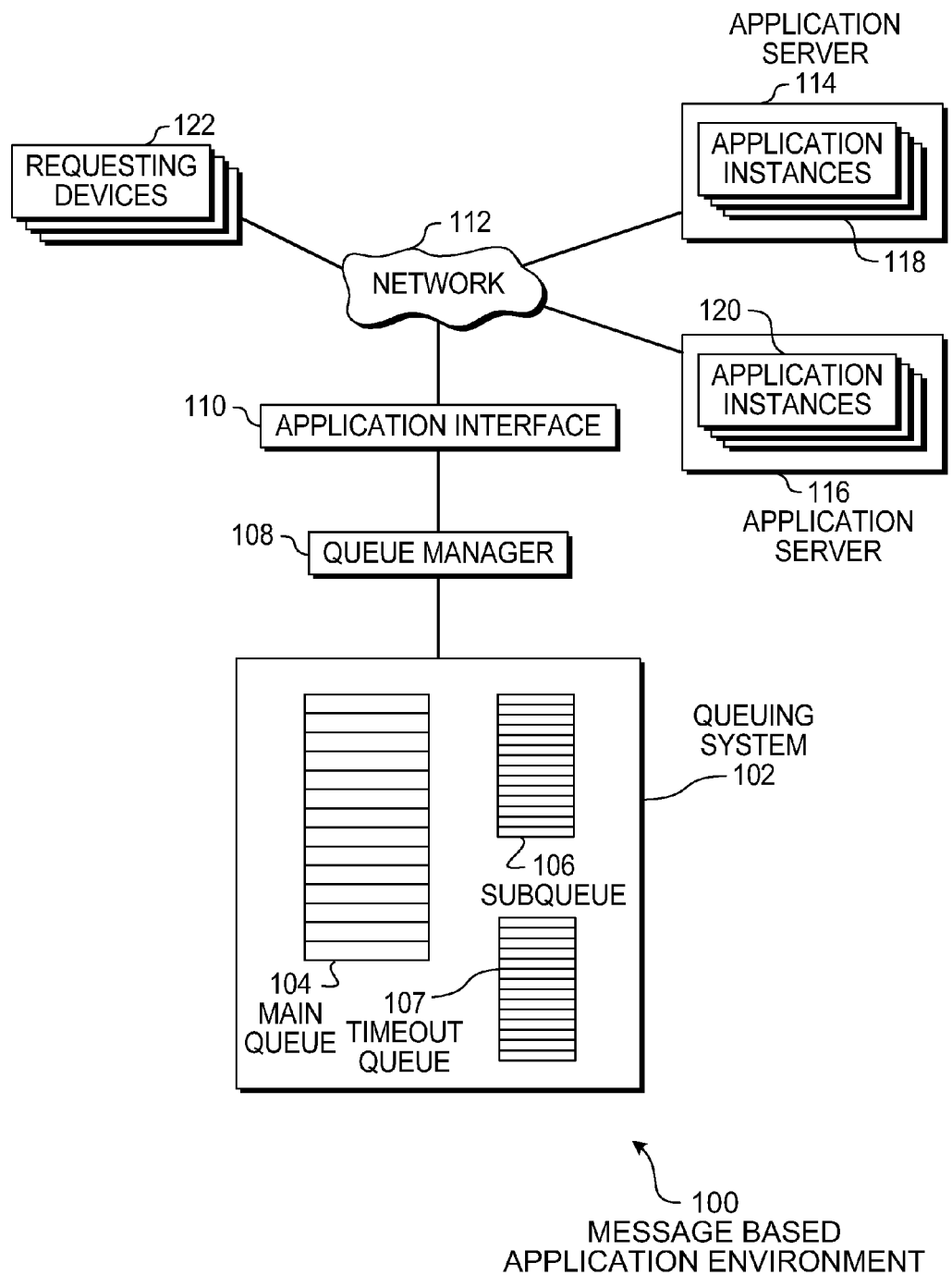
FIG. 1 is a diagram illustration of an embodiment showing a message based application environment.

Peek and lock functionality enables an application to receive and operate on a message while the message remains in a queue. While the application is processing the message, the message may be locked from other applications. After the application has successfully processed the message, the application may direct the message to be deleted from the queue.

The peek and lock functionality enables some atomicity when processing messages from the queue. In many embodiments, if an application stalls or otherwise fails to complete the processing in a designated amount of time, the message may be unlocked and may be made available to another application for processing. If the first application completes the processing after the message has been unlocked, a fault may be received when the first application attempts to delete the message from the queue. The fault may indicate that a second application may be processing the message and that the first application should discard any changes.

When a message undergoes the peek and lock function, the message's order in the queue may be unchanged. When a message is returned to the queue due to a timeout or if an application is unsuccessful, the message may return to the previous order with respect to other messages in the queue. In many cases, such a position may be at the top of the queue ready for the next available application to process the message.

In a message based application environment, a queue of messages may define various tasks that are performed by an instance of an application. Multiple instances of the application may pull messages from the queue and operate on the individual messages in parallel. Many such application environments may be highly scalable.

In many such environments, the applications may be separate, independent processes that may operate on different processors and different devices. Each instance of the application may be subject to failure from many different sources, including inadvertent power failures and other malfunctions.

A timeout mechanism may be used with the peek and lock function to return a message to the main queue after a designated period of time. The timeout mechanism may ensure that a message may be processed even if a failure occurs by an application.

Queue partitioning is a technique that may enable a subqueue or other related queue to be created from a main queue. When a queue is partitioned, messages in a subqueue may continue to have some properties from the main queue. For example, a message may be moved from a main queue to a partitioned subqueue and the message may retain its position in the main queue so that if the message is returned to the main queue, the message may be in the same order as before. In this specification, a subqueue may refer to a partitioned queue.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a message based application environment. Embodiment 100 is a simplified example of the various functions and components that may be used to process messages by several instances of an application. Embodiment 100 is an example architecture that may illustrate the functional components of such a system.

The diagram of FIG. 1 illustrates functional components of a system. In some cases, the component may be a hardware component, a software component, or a combination of hardware and software. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a message based application environment. In a message based application environment, a queuing system 102 may manage incoming messages that are processed by multiple application instances. The application instances may process one message at a time from the main queue 104.

Many applications may be operated using message based technologies. An example may be a search engine that may process individual search requests. The search requests may be managed in the form of messages and may be placed in a queue. An instance of the search engine application may request a message from the queue and process the request. Such an application may be very highly scalable by adding additional application instances to process larger amounts of requests. Since each application instance may be independent of any other application instance, each application instance may operate in parallel. The parallel processing may result in very large throughput for such applications.

One mechanism for operating a message based application environment may use a 'peek and lock' system. When an application requests a message, the contents of the message may be transmitted to the application (the 'peek'), while the message remains in the queue in a locked state so that other applications may not process the message. In some embodiments, the message may be moved to a subqueue so that it appears to be in a locked state in the main queue. When the application returns from successfully processing the message, the message may be removed from the queue and another message may be processed.

During the peek and lock operation, the message or at least a reference to the message may remain in the subqueue so that if the application does not return successfully, the message may be processed by another instance of the application and the message may retain its position in the queue. The application may return an indicator that the processing was unsuccessful or may time out.

In many embodiments, a timer may be started when a message is transmitted to the application. If the application does not return a response within a predetermined amount of time, the message may be unlocked so that another application may attempt to process the message. If the first application instance returns after the timer has expired and after the message has been unlocked, the first application may discard or undo the results of the message.

The embodiment 100 illustrates one architecture for implementing a peek and lock queue management system. A queuing system 102 may contain a main queue 104 and a subqueue 106 and may perform the lower level operations of queue operations. A queue manager 108 may provide the peek and lock functions and other related functions to enable an application interface 110 to accept incoming messages from requesting devices 122 and provide messages and related communications with multiple application servers 114 and 116, each of which may have multiple application instances 118 and 120.

In some embodiments, the queuing system 102, queue manager 108, and application interface 110 may be embodied in one hardware platform. In some embodiments, various functions performed by the queuing system 102, queue manager 108, and application interface 110 may be implemented on different hardware platforms.

The application interface 110 may connect to a network 112 and may receive requests for an application from requesting devices 122 as well as interface to individual application instances 118 and 120. In such an embodiment, the application interface 110 has an external interface to the requesting devices 122 and an internal interface to the various application instances 118 and 120.

Incoming requests may be received from the requesting devices 122 in the form of messages that may be managed by the queue manager 108 and the queuing system 102. In some embodiments, an incoming request may be processed, translated, or otherwise manipulated into a message format that may be managed by the queue manager 108 and related functions.

The requesting devices 122 may be any type of device, application, service, or function that may request service by an application. In the requesting devices 122 may submit a request to the application manager 110 and may receive some communication regarding the request once the request is processed. In some cases, such a communication may come from the application interface 110 while in other cases, the communication may come from the application or from some other source.

From the standpoint of the requesting devices 122, the application interface 110 may be the interface through which the requesting devices 122 communicate with the overall application or service. The application interface 110 may receive requests and transmit results once the request is processed.

From the standpoint of the application instances 118 and 120, the application interface 110 may be the interface through which messages are requested so that the application instances 118 and 120 may process the messages. The application instances 118 and 120 may return results to the application interface 110 for further processing or for forwarding to the requesting devices 122.

The application instances 118 and 120 may be the processing or active portion of an application. The application instances 118 and 120 may be different for various applications. In the example above of a search application, the application instances 118 and 120 may perform the actual search operations. In another example, an accounting application may have application instances 118 and 120 that process individual financial transactions that may be presented as messages. In both examples, the queuing system 102, queue manager 108, and application interface 110 may perform similar functions.

The application interface 110 may receive a request for a message from an application instance. Based on the request, the queue manager 108 may execute a peek and lock function with the queuing system 102 to retrieve a message for the application instance. The peek and lock function may retrieve a message and may lock the message from being retrieved by another application instance.

The queuing system 102 may manage messages in a main queue 104. The main queue 104 may contain the individual messages in a first-in, first-out type of queue. Some embodiments may use different queue types. In order to perform a peek and lock operation, the queuing system 102 may move the message to a subqueue 106 to indicate that the message is locked. A reference to the message may be placed in a timeout queue 107. The subqueue 106 may be related to the main queue 104 such that operations on the messages in the subqueue 106 may retain the message order of the main queue 104.

After a message is locked from other applications by moving it to the subqueue 106 and a reference stored in the timeout queue 107, the message may be passed to the application interface 110 and to an application instance. The application instance may then begin processing the message.

During the time the application instance is processing the message, a timer may be initiated. If the application returns a response before the timer expires, the message may be removed from the subqueue 106 and the message reference may be removed from the timeout queue 107. If the application does not return a response before the timer expires, the queue manager 108 may direct the queuing system 102 to remove the reference to the message from the timeout queue 107 and unlock the message by moving it back from the subqueue 106 to the main queue 104. Such an operation may free the message to be analyzed by another application instance.

The timer operations may be useful when the application instances 118 and 120 are independent of the queuing system 102. For example, the application instances 118 and 120 may operate on application servers 114 and 116 that may be located across a network 112. In some cases, the network 112 may be a local area network while in other cases, the network 112 may be the Internet. In such a case, the application servers 114 and 116 may be located in another physical location and may be subject to power faults, dropped network connections, and other physical impairments to responding to a message. In some cases, the application servers 114 and 116 or the application instances 118 and 120 may be subject to software and operator faults that may cause an application instance to fail to respond.

The application instance may respond with a positive response which may indicate that the message was successfully processed. In such a case, the queue manager 108 may cause the queuing system 102 to remove the message from the subqueue 106 and remove the message reference from the timeout queue 107.

The application instance may respond with a response indicating that the message was not successfully processed. In such a case, the message may be attempted to be processed by another application instance. When the application interface 110 receives a response from an application instance indicating that the message was not successfully processed, the queue manager 108 may direct the queuing system 102 to remove the message reference from the timeout queue 107 and unlock the message by moving it back from the subqueue 106 to the main queue 104. The message may then undergo a peek and lock routine again for another application instance.

When a time out even has occurred, the queue manager 106 may direct the queuing system 102 to remove references to the message from the timeout queue 107 and move the message back to the main queue 104 from the subqueue 106. If the first application returns a successful response after the timer has returned the message to unlocked status and removed the message reference from the timeout queue 107, an attempt to remove the message reference from the timeout queue 107 may return a fault. The fault may occur because the message reference is no longer in the timeout queue 107.

The fault may be used to trigger a communication to the application instance to discard or undo any changes performed. Since the message was unlocked after the time out expired, the message may have been processed or may be in process by another application instance. In order to avoid having the message processed twice, the first application instance may discard any changes. Such an arrangement may be useful when the application instances are capable of atomic operations. The application instance may be configured to commit the transaction when the application interface 110 responds to a completion communication from an application instance with an OK to commit communication.

The queue manager 108 may be a software layer that may implement the peek and lock functionality with a queuing system 102 where such functionality is not natively supported. The queuing system 102 may support the general queuing functions, subqueue operations, and various other primitives.

Figure 2:
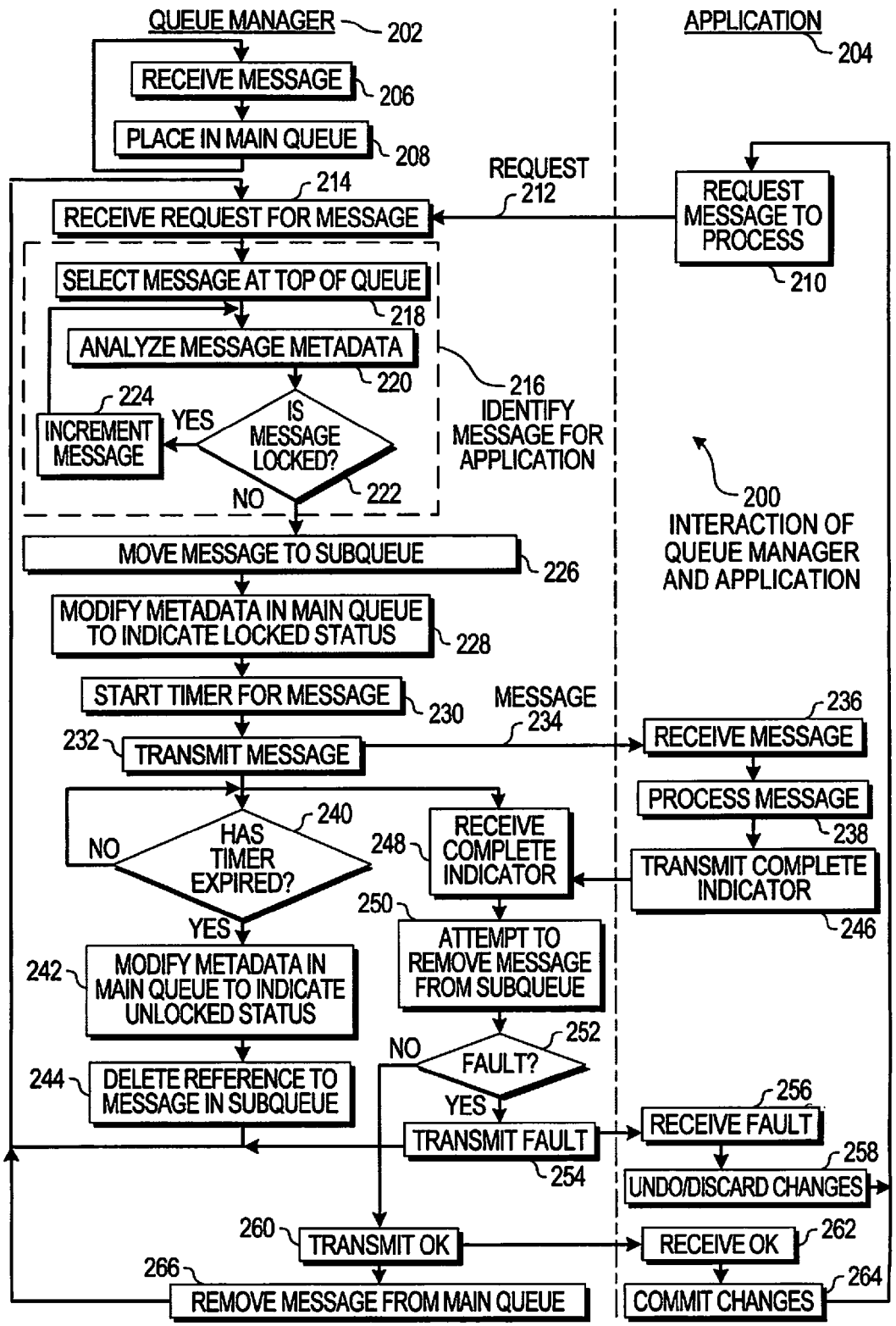
FIG. 2 is a timeline illustration of an embodiment showing a method for operating a message based application environment.

FIG. 2 is a timeline flowchart illustration of an embodiment 200 showing the interaction of a queue system with an application instance. Embodiment 200 is a simplified example of one set of steps or operations that may implement a peek and lock mechanism for managing messages.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of the sequence of interactions and functions that may be performed to implement a peek and lock function, as well as handling various scenarios associated with the peek and lock use.

Operations of a queue manager 202 are illustrated on the left hand side of the diagram and operations of an application 204 are illustrated on the right hand side. The queue manager 202 may include some operations or functions performed by the queuing system 102, the queue manager 108, and the application interface 110 of embodiment 100. The application 204 may be a single instance of an application in some embodiments.

The queue manager 202 may receive messages in block 206 and place the messages in a main queue in block 208. The process of blocks 206 and 208 may operate independently of and in parallel with the other blocks in embodiment 200 and may serve to load the main queue with messages to process.

In block 210, the application 204 may request a message to process. The application 204 may transmit a request 212 that may be received by the queue manager 202 in block 214.

Once the request 212 is received, the queue manager 202 may identify a message for the application in block 216. In block 216, a message may be selected from the top of the queue in block 218. The message selected in block 218 may be the message that has been in the queue the longest time. In many embodiments, a first-in, first-out queue may be used.

The message metadata may be analyzed in block 220 to determine if the message is locked. If the message is locked in block 222, the message may be incremented in block 224 to select the next available message in the queue, and the process may return to block 220.

If the message is not locked in block 222, the current message may be selected.

Different embodiments may use different techniques to accomplish the functionality of embodiment 200. Some embodiments may have sophisticated queue management capabilities that may inherently perform some of the functions of embodiment 200. For example, the actions of block 216 may be inherently performed by a system that uses queue management functions to select a message from the main queue.

A reference to the message may be created in a subqueue in block 226. The reference to the message may be any type of reference such as a pointer or message identifier. In some instances, the reference to the message may be a copy of the message itself.

Along with creating a reference in the subqueue of block 226, the metadata in the main queue may be modified in block 228 to indicate that the message is locked. By locking the message, the message will not be available to another application instance until the message is unlocked.

In many embodiments, a message in a queue may have some metadata associated with the message. Some queuing systems may have a predefined variable, flag, pointer, or other metadata that may be predefined for locking or unlocking a message. In other queuing systems, a general purpose metadata value may be used for such indication.

A timer may be started in block 230. The timer may be used to determine if an excessive amount of time has elapsed for the application to perform its function.

The message may be transmitted from the queue manager 202 to the application 204 in block 232. The message 234 may be received by the application 204 in block 236, where the application 204 may process the message in block 238.

While the application 204 is processing the message in block 238, a check in block 240 determines if the timer has expired. In many cases, a countdown timer may be used to count down from a preset value to zero. In other cases, a timer may count up from zero to a predetermined value. Many different techniques may be used to determine if the timer has expired in block 240. If the timer has not expired, block 240 may loop back on itself.

If the timer has expired in block 240, the metadata in the main queue relating to the message may be modified to unlock the message in block 242. The reference to the message may be deleted from the subqueue in block 244. The message may then be unlocked and ready to be selected again when the process returns to block 214. Since the message was kept in the main queue, the message may retain its original order within the queue. In a typical operation, the oldest messages may be pulled from the queue for processing. If a message failed processing or timed out, the message may be returned to the queue in the same location with respect to the messages in the queue. This generally would mean that the message would be at or near the top of the queue for processing.

In many embodiments, the reference to the subqueue in blocks 226 and 244 may include an identifier for the application instance that is processing the message. The identifier may be stored in a subqueue.

After a message times out in block 240, the message may be able to be processed by another application instance. The second application instance may receive the message and begin processing. In some cases, the first application instance and the second application instance may process the message in parallel.

While the timer is operating in block 240, the operations of block 248 may be performed in parallel.

In embodiments where sophisticated queue management functions are available, the subqueue of block 226 may operate as a timeout queue, and the timeout queue and associated functions may inherently perform the monitoring function of block 240.

When the application completes the processing of block 238, the application may transmit a complete indicator in block 246. The complete indicator may be received in block 248 and the application may attempt to remove the message from the subqueue in block 250.

If the message had timed out in block 240, the message may not be present in the subqueue and the removal may return a fault in block 252. If the fault is returned in block 252, the fault may be transmitted in block 254. Upon receiving the fault in block 256, the application may undo or discard changes that were made because of the message in block 258. The application may return to block 210 to process another message.

A fault may be returned in block 252 when the subqueue does not include the reference to the message being processed. Such a situation may occur when the timer has expired and the reference to the message is removed from the subqueue.

If no fault occurs in block 252, an OK message may be transmitted in block 260 from the queue manager 202 and received by the application 204 in block 262. The application may commit the changes in block 264. By committing the changes in block 264, the application may operate in an atomic fashion, with the committal in block 264 being the atomic action.

After transmitting the OK message in block 260, the message may be removed from the main queue in block 266 and the process may return to block 214.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, the computer system including a first queue, a second queue, and a timeout queue, the second queue physically partitioned as a subqueue of the first queue, a method for using peek lock for message processing, the method comprising:
   receiving a message;
   storing said message in said first queue;
   identifying said message for processing by an application;
   locking said message by:
      physically moving said message from said first queue to said second queue; and
      modifying at least one metadata value relating to said message to indicate that said message is locked;
   subsequent to locking said message, physically storing a reference to said message in said timeout queue;
   transmitting said message to said application to process said message;
   receiving a completion indicator from said application; and
   in response to receiving the completion indicator:
      removing said message from said second queue; and
      removing said message reference from said timeout queue.

2. The method of claim 1 further comprising: initiating a timer.

3. The method of claim 2, wherein receiving a completion indicator from said application comprises receiving a completion indicator from said application prior to expiration of said timer.

4. The method of claim 1, said first queue being a first-in, first-out queue.

5. The method of claim 1, wherein identifying said message for processing comprises:
   identifying another message in said first queue prior to identifying said message in said first queue;
   determining that the other message is locked; and
   incrementing the other message to select said message.

6. The method of claim 1, said application comprising a plurality of instances of said application.

7. The method of claim 1 further comprising:
   receiving a second message;
   storing said second message in said first queue;
   identifying said second message for processing by said application;
   moving said second message into said second queue;
   modifying said at least one metadata value relating to said second message in said first queue, said at least one metadata value indicating that said second message is locked;
   transmitting said second message to said application to process said second message;
   starting a timer for processing said second message;
   detecting expiration of said timer prior to receiving a response from said application that said second message was processed;
   modifying at least one metadata value to indicate that said second message is unlocked;
   removing said second message from said second queue; and
   transmitting a fault indicator to said application subsequent to removing said second message from said second queue.

8. An application execution system comprising:
   one or more processors;
   a plurality of application instances of an application, each of said application instances comprising a mechanism for an application to request a message from a main queue, said application instances being configured to perform at least one operation based on said message;
   a queue manager interface comprising a peek lock function;
   a processor from among said one of more processors executing a queuing system comprising said main queue and a second queue, said second queue being related to said main queue such that the queue manager interface performs said peek lock function by a method comprising:
      receiving a first message;
      storing said first message in said main queue;
      identifying said first message for processing by a first one of said application instances;
      creating a reference to said first message in said second queue;
      modifying at least one metadata value relating to said first message in said main queue, said at least one metadata value indicating that said first message is locked;
      transmitting said first message to said first one of said application instances to process said first message;
      receiving a completion indicator from said first one of said application instances;
      in response to receiving the completion indicator:
         removing said reference to said first message from said second queue; and
         removing said message from said main queue;
      receiving a second message;
      storing said second message in said main queue;
      identifying said second message for processing by a second one of said of said application instances;
      creating a reference to said second message in said second queue;
      modifying said at least one metadata value relating to said second message in said main queue, said at least one metadata value indicating that said second message is locked;
      transmitting said second message to said second one of said application instances to process said second message;
      starting a timer;
      detecting that said timer has passed a predetermined time;
      in response to detecting that said time has passed said predetermined time:
         modifying said at least one metadata value relating to said second message to indicate that said second message is unlocked;
         removing said reference to said second message from said second queue;
      receiving a completion indicator from said second one of said application instances subsequent to detecting that said timer has passed a predetermined time;

attempting to remove said reference to said second message from said second queue based on said completion indicator from said second one of said application instances;

detecting that said reference to said second message is not present in said second queue; and transmitting a fault indicator to said second one of said application instances.

9. The application execution system of claim 8, said method further comprising:

determining at least one change based on said processing of said second message by said second one of said application instances; and discarding said at least one change.

10. The application execution system of claim 9 further comprising:

receiving a third message;

storing said third message in said main queue;

identifying said third message for processing by a third one of said application instances;

creating a reference to said third message in said second queue;

modifying said at least one metadata value relating to said third message in said main queue, said at least one metadata value indicating that said third message is locked;

transmitting said third message to said third one of said application instances to process said third message;

starting said timer;

receiving an unlock indicator from said third one of said application instances;

modifying said at least one metadata value to indicate that said third message is unlocked; and removing said reference to said third message from said second queue.

11. The application execution system of claim 8, said main queue being a first-in, first-out queue.

12. The application execution system of claim 8, at least said first one of said application instances being executed on a first hardware platform and said second one of said application instances being executed on a second hardware platform.

13. At a computer system, the computer system including a first queue and a second queue, the second queue partitioned as a subqueue of the first queue, a method for processing messages, the method comprising:

receiving a message;

storing said message in said first queue;

identifying said message for processing by an application;

creating a message reference to said message in said second queue;

modifying said at least one metadata value relating to said message in said first queue, said at least one metadata value indicating that said message is locked;

transmitting said message to said application to process said message;

starting a timer;

detecting that said timer has passed a predetermined time;

in response to detecting that said predetermined time has passed said predetermined time:

modifying said at least one metadata value to indicate that said message is unlocked; and deleting said message reference from said second queue;

receiving a completion indicator from said application subsequent to detecting that said timer has passed said predetermined time;

attempting to delete said message reference from said second queue in response to receiving said completion indicator;

detecting that said message reference is not present in said second queue; and transmitting a fault indicator to said application.

14. The method of claim 13, said first queue being a first-in, first-out queue.

15. The method of claim 13, said application comprising a plurality of instances of said application.

16. The method of claim 13 further comprising:

receiving a second message;

storing said second message in said first queue;

identifying said second message for processing by said application;

creating a reference to said second message in said second queue;

modifying said at least one metadata value relating to said second message in said first queue, said at least one metadata value indicating that said second message is locked;

transmitting said second message to said application to process said second message and starting a timer;

receiving an unlock indicator from said application;

modifying said at least one metadata value to indicate that said second message is unlocked; and removing said reference to said second message from said second queue.

* * * * *